Dec. 3, 1940.    E. E. NEWTON ET AL    2,224,001
APPARATUS FOR HANDLING STRAND MATERIAL

Original Filed Jan. 14, 1936

INVENTORS
E. E. NEWTON
H. P. RAY
BY Emery Robinson
ATTORNEY

Patented Dec. 3, 1940

2,224,001

UNITED STATES PATENT OFFICE 2,224,001

APPARATUS FOR HANDLING STRAND MATERIAL

Edwin E. Newton, Montreal, Quebec, and Hugh P. Ray, Mount Royal, Quebec, Canada, assignors to Western Electric Company, Incorporated, New York, N. Y., a corporation of New York Original application January 14, 1936, Serial No. 59,062, which is a division of application Serial No. 648,414, December 22, 1932. Divided and this application June 21, 1939, Serial No. 280,298

4 Claims. (Cl. 242—46.4)

This invention relates to apparatus for handling strand material, and more particularly to wire spooling apparatus, and this application is a division of our co-pending application, Serial No. 59,062, filed January 14, 1936, which latter application, now Patent No. 2,177,373, is a division of our application, Serial No. 648,414, filed December 22, 1932, now Patent No. 2,032,950.

An object of the invention is to provide a simple, inexpensive and efficient apparatus for winding or spooling strand material.

In accordance with the above object, one embodiment of the invention contemplates the provision of a wire spooling apparatus in which a take-up spool is frictionally driven through coaxial driving and driven friction disks which are pressed into driving engagement by a spring ring, the driving pressure being adjustable by axial movement of the driving disk relative to the driven disk by means of a ring-shaped yoke pivotally connected to the driving disk and arranged to swing about a fixed external pivot. The take-up spool is removably supported upon a sheet metal holder comprising an annular disk having a series of equally spaced resilient arms projecting from the periphery thereof in alternate opposite directions and at right angles to the plane of the disk.

A complete understanding of the invention and the novel features thereof may be had from the following detailed description when read in conjunction with the accompanying drawing, in which Fig. 1 is a longitudinal sectional view of a wire spooling apparatus embodying the invention;

Figure 1:
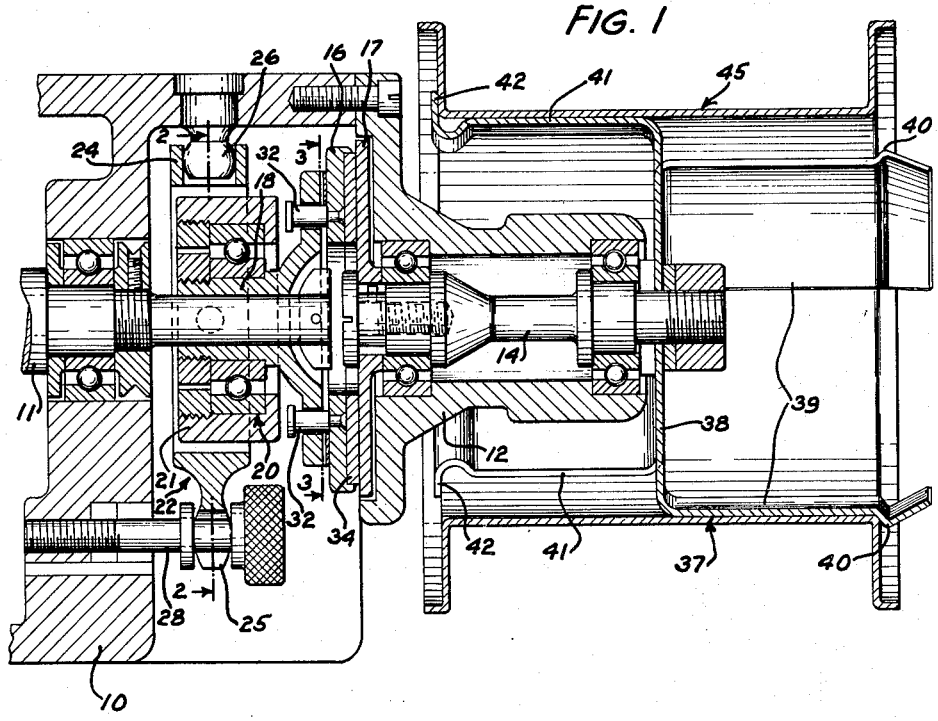
Figure 2:
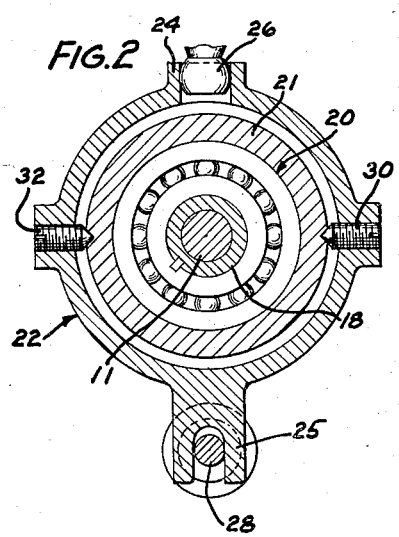
Fig. 2 is a cross-sectional view taken on line 2—2 of Fig. 1.
Figure 3:
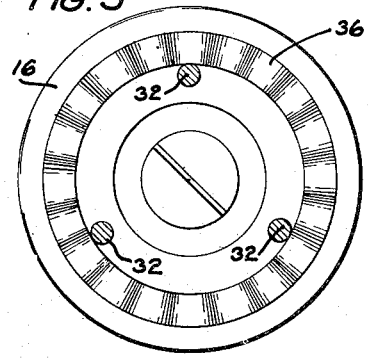
Fig. 3 is a cross-sectional view on line 3—3 of Fig. 1.

Referring to the drawing, there is shown in Fig. 1 a portion of a suitable supporting frame 10, in which there is rotatably journalled a driving shaft 11, only a portion of which is shown. A bracket 12 is secured to the supporting frame and houses a driven shaft 14, which is disposed in axial alignment with the driving shaft. The driven shaft is operatively connected to and driven from the driving shaft through a friction drive comprising coaxial driving and driven friction metal disks 16 and 17, respectively. The driven friction disk is secured to the inner end of the driven shaft and the driving friction disk is carried by a sleeve 18, slidably keyed to the driving shaft 11. The sleeve is fixed in the inner race of a ball bearing 20 and the outer race of the ball bearing is fixed in a ring 21 so that the sleeve is slidable with the ring and is free to rotate therein. A ring-shaped yoke 22 surrounds the ring 21 and is formed with diametrically opposed cylindrical and forked projections 24 and 25, respectively. A fulcrum screw 26 is secured to the supporting frame and extends into the cylindrical projection of the ring-shaped yoke. A double collar adjusting screw 28 is assembled in the forked projection of the yoke and is threaded into the supporting frame. Two pivot screws 30, 30 are secured to the ring portion of yoke 22 at diametrically opposed points spaced 90° from the fulcrum screw 26. The pivot screws pivot in diametrically opposed holes in the ring 21. Thus, when the adjusting screw 28 is turned, the ring-shaped yoke 22 is rocked about the fulcrum screw 26 and by means of the pivot screws 30, ring 21 and ball bearing 20, an endwise movement is imparted to the sleeve 18 longitudinally of the driving shaft 11.

The driving disk 16 is slidably keyed to the sleeve 18 by means of three headed pins 32, 32, and a soft felt friction disk 34 is secured to the metal driving disk on the side facing the driven disk 17. A corrugated spring ring 36 is interposed between metal driving disk 16 and sleeve 18 and surrounds the three pins 32. When the yoke 22 is rocked toward the driven disk 17, the sleeve 18 slides in the same direction and compresses the spring ring 36. This increases the pressure between the driving friction disk 16 and the driven friction disk 17.

Attached to the outer end of driven shaft 14 is a spool holder 37, which is formed from a sheet of spring steel and has a body in the form of a ring or annular disk 38 with six equally spaced radial arms extending therefrom. Three alternate arms 39, 39 extend outwardly and each is formed with an embossment on the end thereof, as shown at 40. The other three arms 41, 41 extend inwardly and each is formed with a shoulder on the end thereof, as shown at 42. The sheet steel from which the spool holder is formed is of sufficient thickness to insure proper spring in the arms 39 to permit sliding a take-up spool 45 over the embossments at the ends of the arms and, when the spool is in its normal position against the shoulders 42 of the arms 41, to provide sufficient spring pressure against the inside of the drum of the take-up spool to drive it.

In the operation of the apparatus, the driving friction disk 16 is rotated at all times a little faster than the maximum desired speed for the take-up spool 45 and driven disk 17, but the rotation of the spool is retarded by the tension of the wire being spooled. Therefore, regardless of the diameter of the spooled wire upon the spool, the spool will rotate only as fast as is permitted by the delivery of wire thereto, and the tension of the wire being spooled is regulated by the pressure between the friction driving surfaces. The rotation of the spool may be stopped by disengaging the friction surfaces.

It is to be understood that the invention is not limited to the particular embodiments thereof herein illustrated and described, except insofar as is defined by the appended claims.

What is claimed is:

1. In a strand handling apparatus, a driven take-up spool shaft, a driving shaft coaxial therewith, and an adjustable friction drive between the two shafts comprising a driven friction disk secured to the driven shaft, a sleeve slidably keyed to the driving shaft, a driving friction disk mounted on the sleeve for rotation therewith, a ring rotatable on the sleeve and slidable therewith, a yoke having a ring-shaped portion surrounding said ring, a cylindrical projection on one side of the ring-shaped portion and a forked projection diametrically opposite the cylindrical projection, a fulcrum screw extending into said cylindrical projection, a pair of pivots connecting the ring-shaped portion of the yoke and the ring, and an adjustable screw connected with said forked projection for swinging the yoke on the fulcrum screw to move the driving friction disk toward and away from the driven friction disk.

2. In a strand handling apparatus, a take-up spool shaft, a driven friction disk secured thereto, a driving shaft coaxial with the take-up spool shaft, a sleeve slidably keyed to the driving shaft, a driving friction disk carried by said sleeve and rotatable therewith for driving said driven disk, and means for adjusting the driving pressure between said disks comprising a ring rotatable on said sleeve and slidable therewith, a ring-shaped yoke surrounding said ring and pivotally connected thereto at diametrically opposed points, a fixed external pivot for said yoke intermediate said opposed points, and means for swinging said yoke about said pivot to move said driving disk relative to said driven disk.

3. In a strand handling apparatus, a rotary take-up spool support, means for rotating said support comprising a driving friction disk and a driven friction disk, and means for adjusting the driving pressure between said disks comprising a slidable member connected to the driving disk, a ring rotatable on said member and slidable therewith, a ring-shaped yoke surrounding said ring and pivotally connected thereto at diametrically opposed points, a fixed external pivot for said yoke intermediate said opposed points, and means connected to said yoke diametrically opposite said fixed pivot for swinging said yoke about said pivot to move the driving disk relative to the driven disk.

4. In a strand handling apparatus, a rotatable reel supporting member, a friction disk coaxial with said member, a coaxial spring ring yieldably pressing said friction disk against a surface of said member, and a metallic disk between the friction disk and said spring ring.

EDWIN E. NEWTON.
HUGH P. RAY.